United States Patent [19]

May et al.

[11] 4,445,924
[45] May 1, 1984

[54] AUXILIARY SIDE HEATER FOR A FLOAT GLASS FORMING CHAMBER

[75] Inventors: Earl L. May, Irwin; William W. Baltzer, Pittsburgh, both of Pa.

[73] Assignee: PPG Industries, Inc., Pittsburgh, Pa.

[21] Appl. No.: 383,414

[22] Filed: Jun. 1, 1982

[51] Int. Cl.³ .............................................. C03B 18/22
[52] U.S. Cl. ................................... 65/182.3; 65/99.3; 65/99.5; 65/182.4
[58] Field of Search ..................... 65/99.3, 99.5, 99.6, 65/182.4, 182.3

[56] References Cited

U.S. PATENT DOCUMENTS

| | | | |
|---|---|---|---|
| 3,533,773 | 10/1970 | Fujimoto et al. | 65/182 |
| 3,930,827 | 1/1976 | Pollock | 65/99.3 |
| 4,322,235 | 3/1982 | Schwenninger | 65/182.3 |
| 4,339,262 | 7/1982 | Liepelt | 65/182.4 X |
| 4,361,430 | 11/1982 | Koontz | 65/99.3 X |

*Primary Examiner*—Arthur D. Kellogg
*Attorney, Agent, or Firm*—Dennis G. Millman

[57] ABSTRACT

In a float glass forming chamber, concentrated heat is applied to edge portions of the glass ribbon being formed by means of portable heating elements carried by side seal members.

10 Claims, 2 Drawing Figures

AUXILIARY SIDE HEATER FOR A FLOAT GLASS FORMING CHAMBER

BACKGROUND OF THE INVENTION

In the process for forming flat glass by the float process a stream of molten glass is delivered onto an elongated pool of molten metal (usually tin or alloys thereof) within a forming chamber. As the layer of glass floats on the molten metal, it is attenuated to form a ribbon of glass of predetermined thickness. As the glass progresses through the forming chamber it is permitted to cool by loss of heat to the molten metal and to the atmosphere within the chamber so that at the exit end of the forming chamber the ribbon may be lifted from the molten metal without deforming.

It is conventional in float forming chambers to provide the roof of the chamber with arrays of electric heating elements so as to control the rate and pattern with which the glass cools. Because the glass tends to lose heat faster near the sides of the forming chamber it is often desirable to provide more heat to the side portions than to the center portions of the forming chamber. Power can be applied to more of the roof heaters overlying the marginal areas of the glass than to those over the central portion to compensate for the faster cooling at the sides, but because of the distance between the roof heaters and the glass such a differential heating arrangement does not direct the heat to the marginal portions as controllably as is desired. Conventionally, heating elements in float forming chambers have been located generally above the elevation of the side access openings so as to not interfere with the attenuating devices inserted through the side seal areas.

In U.S. Pat. No. 4,322,235 float forming chamber heaters are arranged above only the marginal portions of the glass, but are likewise located in the upper portion of the chamber and thus do not focus their heat as specifically onto the marginal portions of the glass as would be desired.

U.S. Pat. No. 3,533,773 shows a low edge heater in a float chamber, but is limited by design to a specific location near the area where the molten glass is delivered into the forming chamber.

Thus, it can be seen that there is a need for means to apply heat to marginal edge portions of the glass in a float chamber from an elevation closely adjacent to the glass surface. Moreover, it would be highly advantageous for such a heating means to be adaptable to being employed at various locations along the side of the float chamber so as to optimize its effectiveness and to adapt to process changes.

SUMMARY OF THE INVENTION

In the present invention heat is applied to the marginal edge portions of a ribbon of glass in a float forming chamber by electric heating means carried by one or more side seal members. The combination side seal heater incorporates an electric heating element extending horizontally through the body of the side seal so that the heated end of the heating element may extend into the interior of the float chamber so as to closely overlie marginal edge portions of the glass passing therethrough. The opposite end of the heating element to which electrical connections are made extends beyond the exterior of the main body of the side seal member. In preferred embodiments the electrical connections are enclosed within a housing carried on the outside of the side seal member. The interior of the housing may be provided with inert atmosphere to retard oxidation of the electrical connectors and leads. The side seal heater of the present invention may be substituted for any of the ordinary side seals thereby providing versatility in its placement along the sides of the float chamber. Normally the side seal heaters would be employed in pairs opposite one another on opposite sides of the chamber. In preferred embodiments each side seal heater carries a plurality of heating elements. A plurality of the side seal heaters may be employed along each side of the float chamber.

The invention will be more fully understood from the detailed description of a preferred embodiment which follows.

THE DRAWINGS

DETAILED DESCRIPTION

Figure 1:
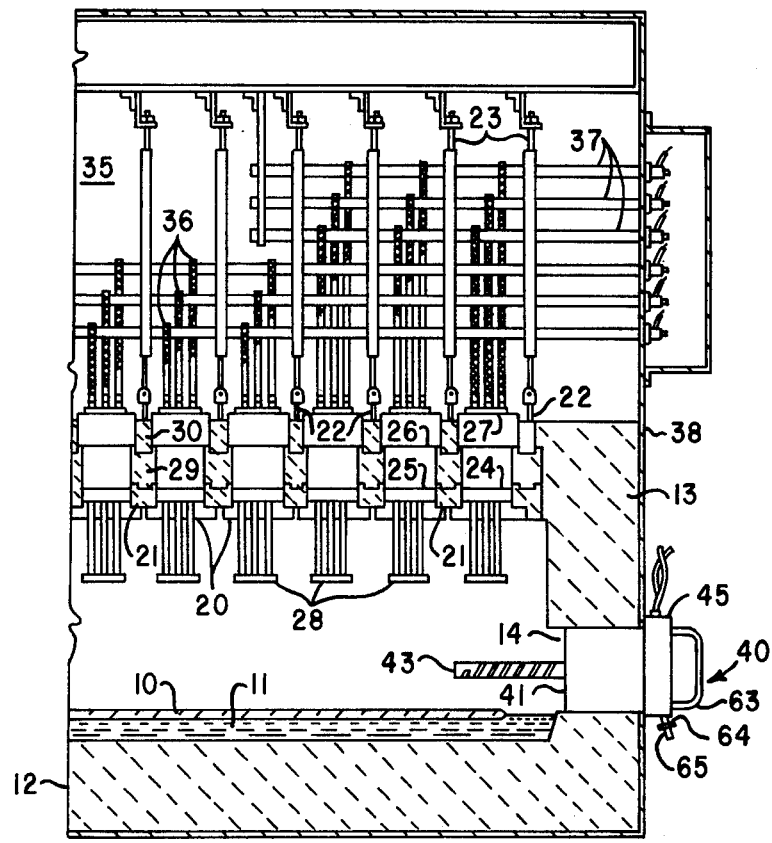
FIG. 1 is a vertical cross-section through one-half of a float forming chamber of conventional design looking in the direction of glass travel, in which is incorporated a preferred embodiment of side seal edge heater in accordance with the present invention.

Referring to FIG. 1, a ribbon or sheet of glass 10 being formed floats on a pool of molten metal 11 (usually tin or alloys thereof, although copper or mixtures of tin and copper may also be employed) within a float forming chamber. The molten metal pool is contained by a refractory basin 12. The chamber enclosure is further comprised of refractory side walls 13 suspended from above by a steel superstructure (not shown), and the bottoms of the side walls are spaced above the edges of the basin 12 so as to leave an access opening 14 extending along much of the sides of the float chamber.

A typical roof arrangement is shown in FIG. 1 and is based on a support grid comprised of a large number of transversely extending support members 20 and longitudinally extending support members 21, both of which are preformed ceramic pieces. Vertically extending hanger rods 22 have hook-like members at their lower ends (not shown) which engage and interlock the ends of adjacent transverse support members 20. The longitudinal support members 21 span adjacent rows of the transverse support members 20 upon which they rest at opposite ends. The hanger rods 22 are in turn supported from above by rods 23 fastened at their upper ends to the overhead superstructure. Into the rectangular openings in this grid are inserted a large number of electric heating elements, each of which consists of a sandwich of refractory pieces 24, 25, 26 and 27 fastened together by means of vertically extending tie rods (not shown), with a vertically extending three-legged electrical resistance heating element 28 passing through the refractory pieces. The bottom refractory member 25 of each composite heating element overlaps and rests upon adjacent transverse support members 20. The spaces between the heating elements are filled with additional refractory members 29 and 30 which rest on the longitudinal support member 21 between the hangers 22. Heaters are shown inserted in each of the grid openings in FIG. 1 as is the case in some zones of a conventional float chamber, but in other zones a particular cross-section may have some or all of the openings filled with blind plugs rather than heater elements.

In the FIG. 1 float chamber a large upper plenum 35 is provided above the roof to accommodate electrical connections to the roof heater elements. Each leg of the resistance elements 28 is connected at its upper end to its lead 36 which is in turn connected to a bus bar 37 in a three phase alternating current system. Because the float chamber is usually provided with an inert or reducing gas atmosphere, the entire chamber including the upper plenum 35 is enclosed in a metal casing 38 to make the entire structure essentially gas tight.

In the drawings there is shown a preferred embodiment of side seal edge heater designated generally as 40, and in FIG. 1 the edge heater 40 is shown mounted within the side seal access opening 14. The construction of the side seal heater 40 is shown in greater detail in the enlarged view of FIG. 2. The side seal heater is based on a body 41 of refractory material such as a castable refractory cement. The refractory body 41 is provided with one or more horizontally extending bores 42, through each of which extends an electrical resistance heating element 43. An example of a suitable heating element 43 is shown in the drawings, and is of a commercially available type fabricated from a silicon carbide tube cut at one end in a double helix to form two electrical resistance paths, and bisected at its other end to form two relatively low resistance electrical paths. In the embodiment shown, the helically cut portion extends beyond the body of the side seal member, and when in the operating position shown in FIG. 1, extends toward the edge of the glass ribbon 10 and preferably overlies marginal portions of the glass ribbon. Other types of electrical heaters may be employed with the present invention such as the three-legged type of heating elements employed as the roof heaters 28, in which case a three phase power source is employed. Preferably, each edge heater unit 40 carries two or more of the heating elements 43 spaced apart horizontally, but preferably the number of heating elements does not exceed three so as avoid making the heater unit so large as to be unwieldy. If three of the helical type heating elements are employed, they may be connected to a three phase power source.

The relatively low resistance end of each heating element also extends beyond the body portion 41 and terminates within a housing 45. The housing 45 may be fabricated of metal and is preferably substantially gas tight. The housing 45 may be affixed to the refractory body portion 41 by any suitable means. In the embodiment depicted in FIG. 2, wherein the body portion 41 is a castable cement, the connection may be made by means of anchor members fastened to the housing 45 and around which the cement may be cast. The anchors may take the form of a rod-shaped leg 46 extending horizontally from the housing and a cross member 47 welded to the end of the leg 46.

Figure 2:
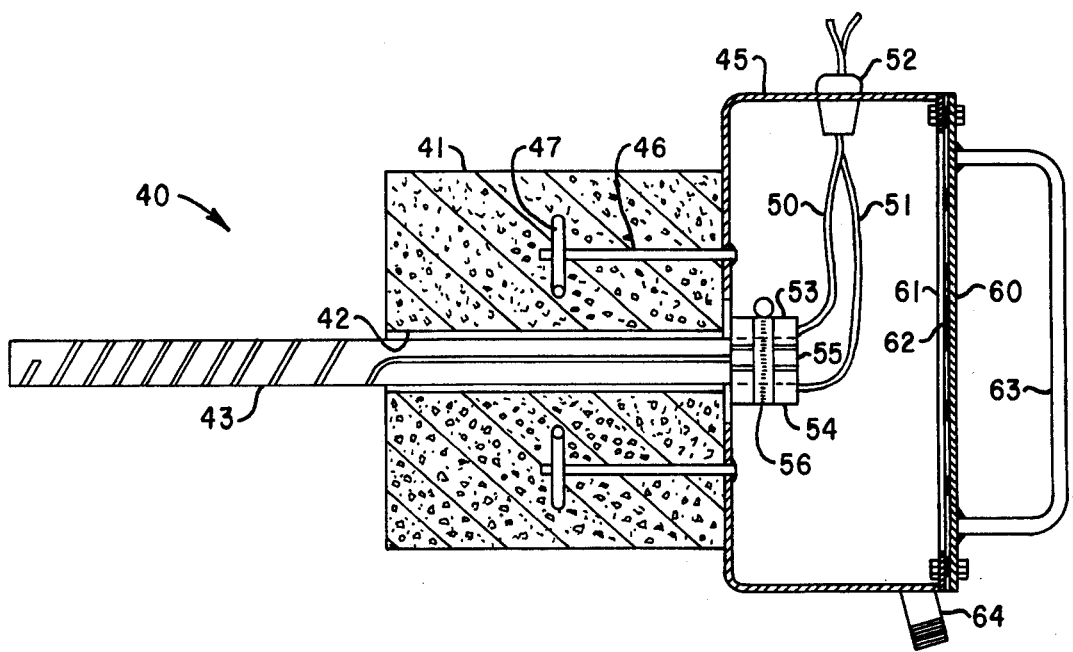
FIG. 2 is an enlarged cross-section through the preferred embodiment of side seal edge heater of the present invention.

Within the housing, electrical connections are made to each heater element. For example, as shown in FIG. 2, electrical leads 50 and 51 may be clamped onto the opposite electrical paths of the helical heater element 43. The electrical leads may enter the housing 45 through a grommet 52. Separate clamp halves 53 and 54 are separated by an insulator block 55, and the electrical leads are pressed into contact with the heating element by means of a tightening strap 56. Insulation is also provided under the tightening strap 56 to avoid electrical shorting.

Access to the interior of the housing 45 may be provided by a door 60 bolted onto flanges 61. Gasket material 62 may be provided between the door 60 and the flanges 61 to make the enclosure gas tight. Handles 63 may be provided on the housing to expedite manipulation of the edge heater unit. The housing is preferably provided with a pipe fitting 64 which may be connected to a conduit 65 (FIG. 1) supplying an inert or reducing gas atmosphere to the interior of the housing 45. The reducing or inert gas atmosphere retards oxidation of the electrical connections within the housing both chemically and by reducing the temperature of the connections. The gas may be permitted to escape through the bores 42 into the interior of the float forming chamber.

It can be appreciated from the structure of the side seal heating elements that they enable heat to be applied closely adjacent to the surface of the glass ribbon along the edge portions thereof. Such a heating element inserted into the side seal access openings of a conventional float forming chamber can provide the electrical heating element 43 at an elevation of 25 cm or less above the glass surface, and in some cases, the spacing may be reduced to 15 cm or less. Therefore, the heat can be directed onto the cooler edge portions of the glass ribbon more effectively than the heat from the roof heaters which are spaced considerably farther above the glass ribbon.

It should be evident that the side seal edge heaters of the present invention may be structurally embodied in a variety of ways and that the specific embodiment described herein is for the purpose of illustrating a best mode only. One variation that may be desirable would be to form some of the refractory body 41 or portions thereof of heat resistant materials lighter in weight than castable cements so as to reduce the weight of the heater units, thereby making them easier to manipulate. Other variations and modifications as are known to those of skill in the art may be resorted to without departing from the spirit and scope of the invention as defined by the claims which follow.

We claim:

1. An apparatus for forming flat glass by the float process comprising an elongated basin containing a pool of molten metal, a roof and sidewalls supported over the basin defining an enclosed forming chamber, the sidewalls spaced above side portions of the basin so as to provide access openings along the sides of the chamber, portable side seal members removably inserted into the access openings to close the openings, means for delivering a stream of molten glass onto the molten metal at one end of the chamber, means at the opposite end of the chamber for withdrawing a formed glass ribbon from the chamber, and main heating elements in the upper portion of the chamber, the improvement comprising: at least one of the side seal members carrying an auxiliary electric heating element extending substantially horizontally into the chamber so as to extend into close proximity to edge portions of the ribbon of glass being formed, the heating element being provided with cantilever support by the side seal member so as to provide the portion of the heating element extending into the chamber with restricted horizontal width and with vertically open space adjacent thereto so that the edge portions of the glass ribbon are exposed to heat from both the auxiliary heating element and overlying portions of the main heating elements.

2. The apparatus of claim 1 wherein the side seal member carrying the electric heating elements includes an interior body portion comprised of refractory material, through which the electric heating element passes, and adapted to be received within the side access openings; and an exterior housing fixed to the interior body portion adapted to enclose an end of the electric heating element.

3. The apparatus of claim 2 further including electrical leads passing through the housing, and electrical clamp means within the housing for clamping the electrical leads to said end of the electric heating element.

4. The apparatus of claim 1 wherein at least one of the side seal members carries a plurality of the horizontally extending electric heating elements.

5. The apparatus of claim 1 or 4 wherein a plurality of the side seal members carry electric heating elements.

6. The apparatus of claim 5 wherein the side seal members carrying electric heater elements are positioned in pairs opposite one another on opposite sides of the float forming chamber.

7. The apparatus of claim 1 wherein the electric heating elements are of the type having a double helical electrical path along a portion of their lengths.

8. The apparatus of claim 2 wherein the housing is in communication with a source of inert or reducing gas.

9. The apparatus of claim 1 wherein the auxiliary heating element is at an elevation of no more than 25 cm above the surface of the glass ribbon in the float forming chamber.

10. The apparatus of claim 1 or 9 wherein a portion of the auxiliary heating element overlies marginal edge portions of the glass ribbon being formed in the forming chamber.

* * * * *